United States Patent
Wakasa et al.

(10) Patent No.: US 7,291,313 B2
(45) Date of Patent: Nov. 6, 2007

(54) NOX REMOVAL SYSTEM FOR BOILERS

(75) Inventors: Satoshi Wakasa, Matsuyama (JP);
Noboru Takubo, Matsuyama (JP);
Yukihiro Isshiki, Matsuyama (JP);
Kouichi Masuda, Matsuyama (JP);
Nobuyuki Ishizaki, Brantford (CA)

(73) Assignees: Miura Co., Ltd., Ehime-Ken (JP);
Miura Institute of Research & Development Co., Ltd., Ehime-Ken (JP)

( * ) Notice: Subject to any disclaimer, the term of this patent is extended or adjusted under 35 U.S.C. 154(b) by 0 days.

(21) Appl. No.: 11/022,874

(22) Filed: Dec. 28, 2004

(65) Prior Publication Data

US 2005/0152822 A1 Jul. 14, 2005

Related U.S. Application Data

(63) Continuation of application No. 09/780,349, filed on Feb. 12, 2001, now abandoned.

(30) Foreign Application Priority Data

Feb. 28, 2000 (JP) .............................. 2000-050851

(51) Int. Cl.
*B01D 50/00* (2006.01)

(52) U.S. Cl. ..................................... 422/172; 422/182
(58) Field of Classification Search ................ 422/172, 422/177, 182; 165/156, 184; 122/235.11
See application file for complete search history.

(56) References Cited

U.S. PATENT DOCUMENTS

| 5,233,934 | A | 8/1993 | Krigmont et al. |
| 5,281,403 | A | 1/1994 | Jones |
| 5,315,941 | A | 5/1994 | Vetterick et al. |
| 5,543,123 | A | 8/1996 | Hofmann et al. |
| 5,820,838 | A | 10/1998 | Tsuo et al. |
| 5,985,222 | A | 11/1999 | Sudduth et al. |
| 6,116,196 | A * | 9/2000 | Watanabe et al. ...... 122/235.11 |
| 6,361,754 | B1 * | 3/2002 | Peter-Hoblyn et al. .. 423/213.2 |

FOREIGN PATENT DOCUMENTS

JP          10246403        * 9/1998    ............ 122/235.11

* cited by examiner

*Primary Examiner*—Glenn Caldarola
*Assistant Examiner*—Tom Duong
(74) *Attorney, Agent, or Firm*—Birch, Stewart, Kolasch & Birch, LLP

(57) ABSTRACT

The invention provides a NOx removal system for use in a boiler for realizing further reduction in NOx. Loading means for loading a reducing agent is provided at the outlet of a gas passageway in the boiler body, and a NOx removal catalyst is provided downstream of the loading means.

10 Claims, 4 Drawing Sheets

NOX REMOVAL SYSTEM FOR BOILERS

CROSS REFERENCE TO RELATED APPLICATIONS

The present invention is a continuation of U.S. application Ser. No. 09/780,349, filed Feb. 12, 2001 now abandoned.

BACKGROUND OF THE INVENTION

The present invention relates to a NOx removal system for use in a boiler and for reducing NOx.

As measures for NOx reduction in boilers, there have been practiced two-stage combustion, exhaust gas recirculation and the like. In the two-stage combustion, combustion air is supplied in two stages to the burner, where the fuel is burned with a smaller amount of air than necessary for complete combustion in the first stage, and the remaining amount of air necessary for complete combustion is supplied in the second stage. In the exhaust gas recirculation, on the other hand, exhaust gas generated by combustion is circulated so as to be remixed with the fuel. However, in recent years, there have been growing concerns for environmental issues, posing a demand for further reduction in NOx.

SUMMARY OF THE INVENTION

An object of the present invention is to provide a NOx removal system in boilers for realizing further reduction in NOx.

In order to achieve the above object, the present invention provides a NOx removal system for use in a boiler, which comprises: loading means serving for loading a reducing agent and provided at an outlet of a gas passageway in a boiler body; and a NOx removal catalyst provided downstream of the loading means.

In an embodiment of the invention, in the NOx removal system as described above, the reducing agent is ammonia.

In an embodiment of the invention, in the NOx removal system as described above, the reducing agent is urea water itself or ammonia obtained by decomposing urea water.

In an embodiment of the invention, in the NOx removal system as described above, the loading means operates to load the reducing agent toward its upstream side.

Next, an embodiment of the present invention is described. This invention is preferably embodied as a NOx removal system for boilers, for example, multi-tubular boilers. In the boiler body, a plurality of heat transfer tubes are disposed in the gas passageway, and a burner is provided at one end of the gas passageway while an exhaust gas exit is provided at the other end. Then, at an outlet of the gas passageway, is provided loading means for loading a reducing agent to reduce NOx in combustion gas. This loading means is so designed, for example, that the reducing agent in a tank is supplied to a jet nozzle by a pump and jetted out from this jet nozzle. Amount of the reducing agent is adjusted depending on the amount of NOx generation.

Also, a NOx removal catalyst is provided downstream of the loading means, i.e., at the exhaust gas exit. This NOx removal catalyst has a function of accelerating reductive reaction of NOx. Therefore, the reducing agent and the combustion gas mixed together at the outlet of the gas passageway are led to the NOx removal catalyst, where the reaction of NOx and the reducing agent is accelerated by the NOx removal catalyst. Thus, the NOx in the combustion gas is reduced and decreased to a great extent.

For this arrangement, ammonia, urea water or the like is used as the reducing agent. Ammonia is used in a state of aqueous solution or gas. Urea water may be used as it is or after it is decomposed into ammonia. When urea water is used as it is, it is preferable that combustion gas temperature at the outlet of the gas passageway be about 450° C. or more. This is because urea water is decomposed completely into ammonia and $CO_2$ at about 450° C. or more. When urea water is used as ammonia after decomposition, on the other hand, the loading means is equipped with decomposition means for decomposition from urea water to ammonia. This decomposition means is designed to generate ammonia, for example, by heating urea water. As the reducing agent, also available are compounds which are decomposed by heating or other process to generate ammonia, such as cyanuric acid, melamine and biuret.

In loading the reducing agent from the loading means, its loading direction, or jet-out direction from the jet nozzle is selected, in one or some plurality, from among a direction toward the upstream side, a direction toward the downstream side and a direction crossing the flow of combustion gas. Among these directions, when the direction toward the upstream side is adopted for the loading of the reducing agent, the reducing agent is loaded in such a direction as to confront the combustion gas, which is effective for accelerating the mixing of the reducing agent and the combustion gas. In particular, when the reducing agent is loaded toward gaps between adjacent heat transfer tubes, the places where the reducing agent is loaded are those of high gas flow rate, so that the mixing of the reducing agent and the combustion gas is further accelerated.

As shown above, according to this constitution, by the loading of the reducing agent, the generation of NOx can be reduced to a great extent. Still, since the loading means is provided at the outlet of the gas passageway, the reduction in NOx can be achieved without adversely affecting the combustion in the burner or the heat transfer in the heat transfer tubes. Also, since the space at the outlet of the gas passageway can be effectively utilized as a fitting space for the loading means, the loading means can be easily provided additionally to existing boilers without requiring any additional space.

The present invention may be embodied also in a boiler having a boiler body constitution in which a combustion chamber is defined inside an annular heat transfer tube array and an annular gas passageway is provided outside the annular heat transfer tube array. For example, the gas passageway is defined between coaxially provided two annular heat transfer tube arrays, where the combustion chamber and the gas passageway are communicated with each other by a first opening provided at part of the inner annular heat transfer tube array, while the gas passageway and an exhaust gas exit are communicated with each other by a second opening provided at part of the outer annular heat transfer tube array (where the second opening is located 180-degree opposite to the first opening). In a boiler having this boiler body, the loading means is provided at the outlet of the gas passageway, i.e., near the second opening.

DETAILED DESCRIPTION OF THE PREFERRED EMBODIMENTS

Figure 1:
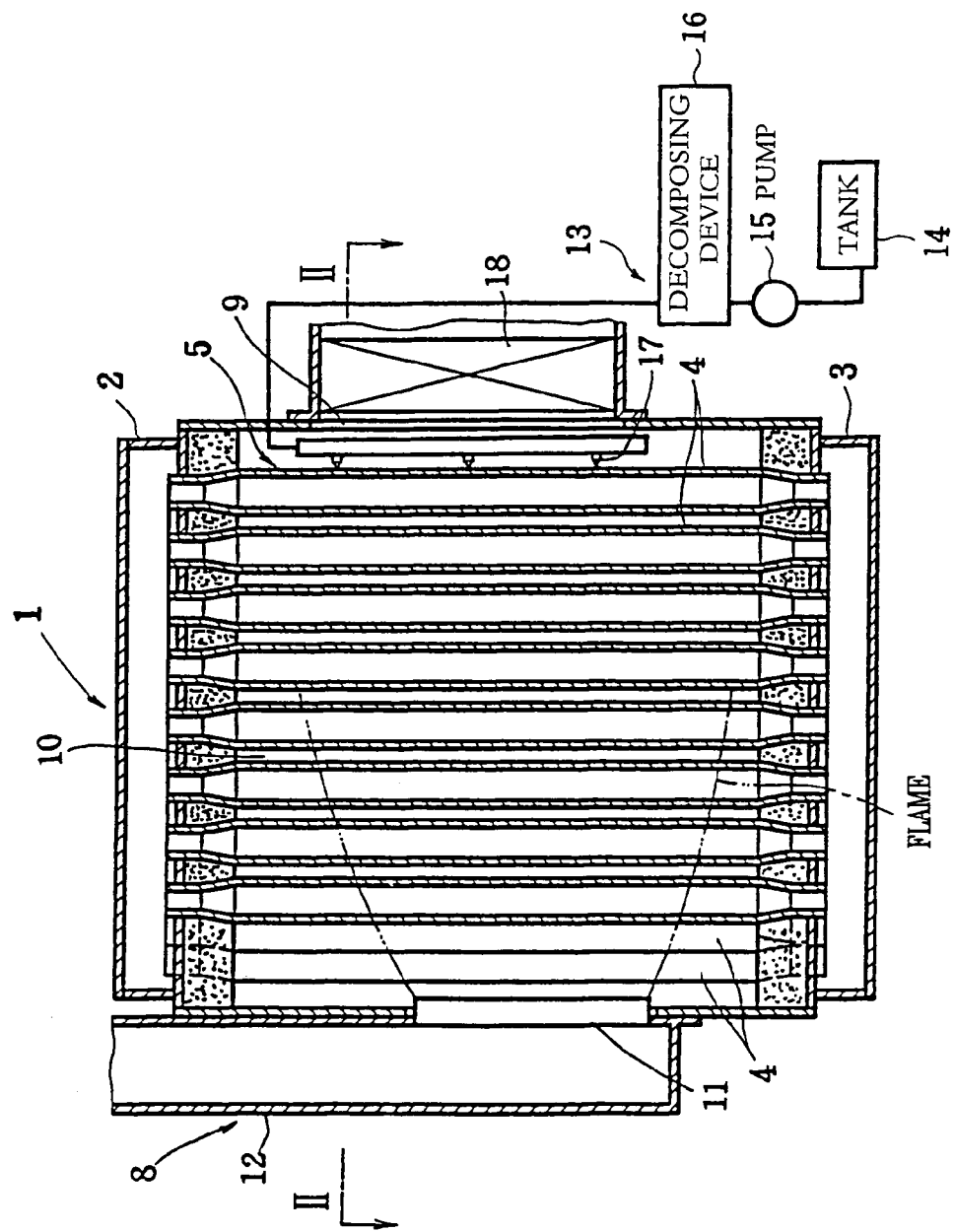
FIG. 1 is a longitudinal sectional explanatory view showing a first embodiment of the present invention.
Figure 2:
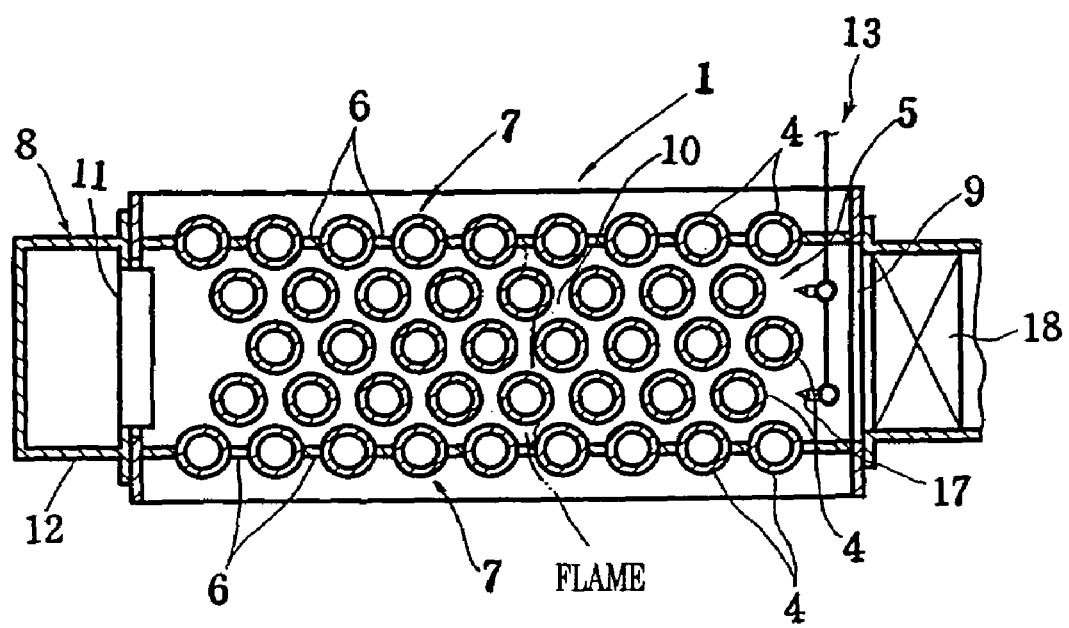
FIG. 2 is a cross-sectional explanatory view showing a cross section taken along the line II-II of FIG. 1.

Hereinbelow, concrete embodiments of the present invention are described in detail based on the accompanying drawings. First, a first embodiment shown in FIGS. 1 and 2 is described. Referring to FIGS. 1 and 2, a boiler body 1 has an upper header 2 and a lower header 3. Between these headers 2, 3, a plurality of heat transfer tubes 4, 4, . . . are arrayed in five lines in a staggered arrangement. These heat transfer tubes 4 constitute a heat transfer tube group 5. Upper end and lower end of each heat transfer tube 4 are connected to the upper header 2 and the lower header 3, respectively. Then, heat transfer tubes 4 of both outermost lines out of the heat transfer tube group 5 constitute heat transfer tube walls 7, 7 by connecting adjacent heat transfer tubes to each other by means of first longitudinal fin members 6, 6, . . . .

Across the heat transfer tube walls 7, a burner 8 is provided on one end side while an exhaust gas exit 9 is provided on the other end side. Therefore, between the heat transfer tube walls 7, is defined a gas passageway 10 which leads from the burner 8 to the exhaust gas exit 9. Also in this boiler, the burner 8 is disposed in proximity to the heat transfer tube group 5.

The burner 8, in this first embodiment, is made into a premixing type planar-combustion burner. Therefore, the burner 8 is equipped with a flame holder 11 having a multiplicity of jet holes (not shown) for pre-mixed gas. The burner 8 is also equipped with a wind box 12. This wind box 12 supplies the pre-mixed gas to the flame holder 11.

At the outlet of the gas passageway 10, a reducing agent loading means 13 is provided. This loading means 13, which is designed to generate ammonia by decomposing urea water and to load this ammonia as a reducing agent, comprises, in an order from above, a tank 14 for reserving urea water therein, a pump 15 for supplying the urea water, decomposition means 16 for decomposing the urea water to generate ammonia, and a specified number of ammonia jet nozzles 17, 17, . . . . The decomposition means 16 is equipped with appropriate heating means (not shown) such as an electric heater.

In this arrangement, the jet nozzles 17 are disposed so as to jet out ammonia in a direction opposite to the flow direction of combustion gas in the gas passageway 10. Then, the jet nozzles 17 are arrayed toward between the three heat transfer tubes 4 located most downstream in the gas passageway 10, in a total number of six, three for each interspace, along the axial direction of the heat transfer tubes 4.

Also, a NOx removal catalyst 18 is provided at the exhaust gas exit 9. Therefore, the reaction of NOx and ammonia is accelerated by the NOx removal catalyst 18.

With this constitution, when the burner 8 is operated, the pre-mixed gas from the flame holder 11 starts burning, making a combustion-reacting gas, i.e., a combustion gas in a flame state. Then, this combustion gas in the flame state, while continuing combustion reaction within the heat transfer tube group 5, flows toward the exhaust gas exit 9, and discharged from the exhaust gas exit 9 as exhaust gas.

During the operation of the burner 8, the loading means 13 is operated. Then, the urea water in the tank 14 is supplied by the pump 15 to the decomposition means 16, and the urea water is heated and decomposed in the decomposition means 16, by which ammonia is generated and this ammonia is supplied to the jet nozzles 17. In this connection, the pump 15 is so designed as to supply urea water in an amount responsive to the amount of generated NOx in the boiler. The ammonia jetted out from the jet nozzles 17 is mixed with the combustion gas at the outlet of the gas passageway 10. In this process, ammonia is jetted out in a direction opposite to the flow direction of combustion gas, thus accelerating the mixing of ammonia and combustion gas. Then, the mixed ammonia and combustion gas are led to the NOx removal catalyst 18, where the reaction of NOx and ammonia is accelerated by the NOx removal catalyst 18, so that NOx in the combustion gas is reduced and decreased to a large extent.

The jet nozzles 17, which are provided at the outlet of the gas passageway 10, do not hinder the combustion in the burner 8 or the heat transfer in the heat transfer tubes 4 even though ammonia is jetted out from the jet nozzles 17. Also, since the space at the outlet of the gas passageway 10 can be effectively utilized as a fitting space for the jet nozzles 17, the jet nozzles 17 can be easily provided additionally to existing boilers without requiring any additional space.

Further, in this boiler, since the combustion gas in the flame state from the burner 8 is rapidly cooled by the heat transfer tube group 5, there occurs almost no such high temperature regions that thermal NOx is generated. Therefore, the boiler, although originally less in exhaust amount of NOx, is enabled to attain further reduction in NOx by virtue of the provision of the loading means 13.

Figure 3:
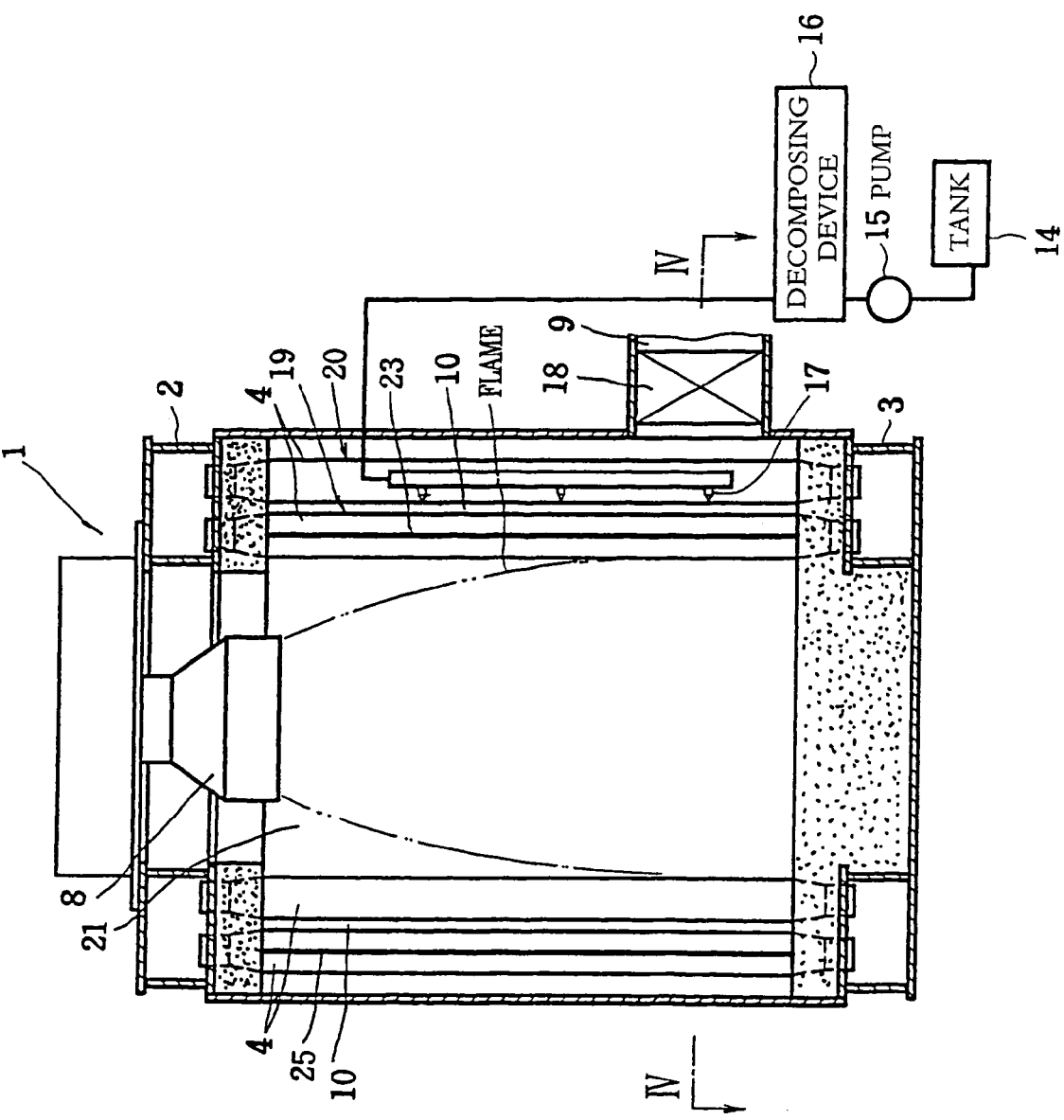
FIG. 3 is a longitudinal sectional explanatory view showing a second embodiment of the present invention.
Figure 4:
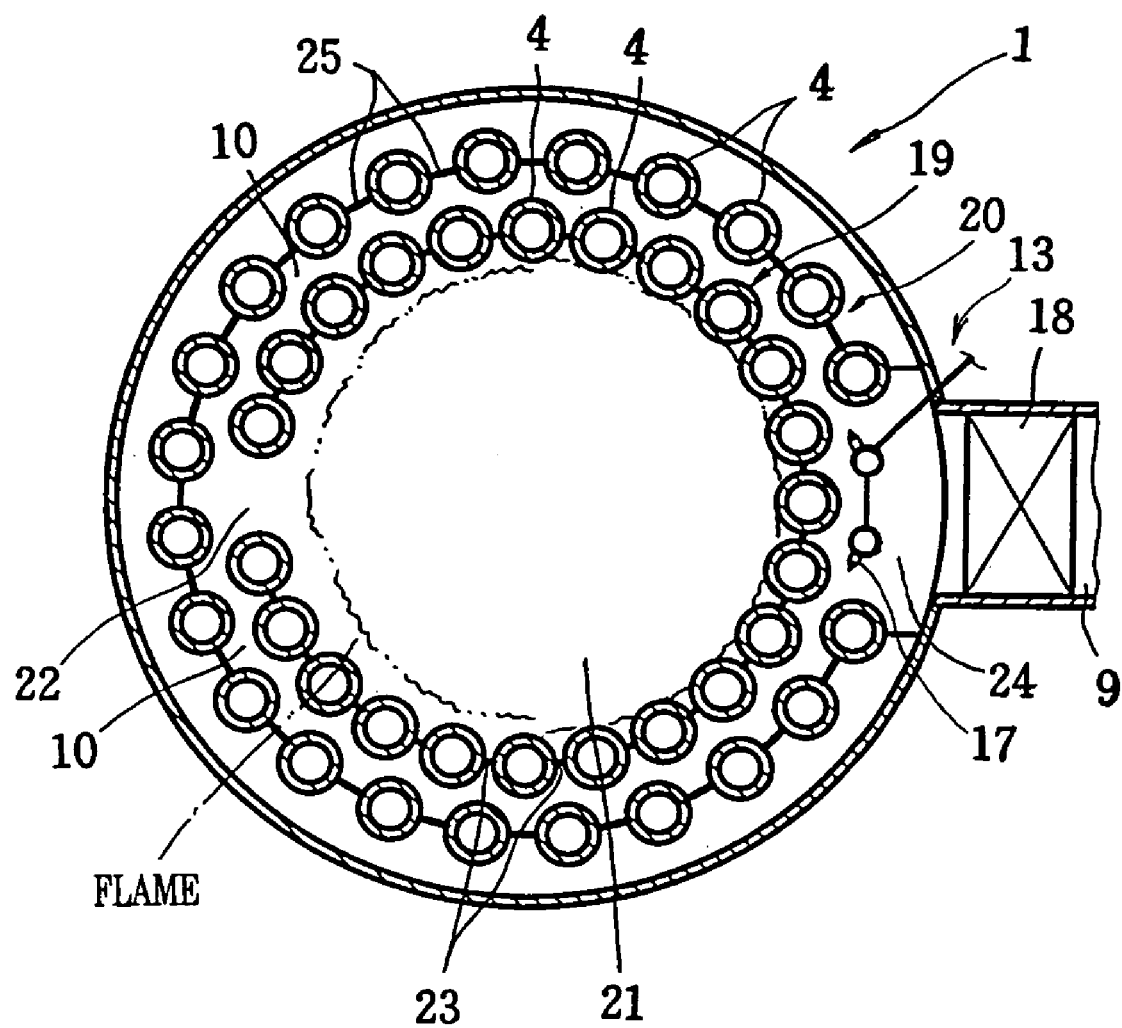
FIG. 4 is a cross-sectional explanatory view showing a cross section taken along the line IV-IV of FIG. 3.

Next, a second embodiment shown in FIGS. 3 and 4 is described. Referring to FIGS. 3 and 4, a boiler body 1 has an upper header 2 and a lower header 3, and a plurality of heat transfer tubes 4, 4, . . . are arrayed in an annular arrangement between these headers 2, 3. These heat transfer tubes 4 constitute an inner-and-outer double annular heat transfer tube array, i.e., a first heat transfer tube array 19 on the inner side and a second heat transfer tube array 20 on the outer side. Upper end and lower end of each heat transfer tube 4 are connected to the upper header 2 and the lower header 3, respectively. Then, a burner 8 is fitted to the upper header 2, where the space inside the first heat transfer tube array 19 is defined as a combustion chamber 21.

A first opening 22 is provided at part of the first heat transfer tube array 19. Then, the heat transfer tubes 4 in the first heat transfer tube array 19 are connected to one another by second longitudinal fin members 23, 23, . . . except the first opening 22. Also, a second opening 24 is provided at part of the second heat transfer tube array 20. Then, the heat transfer tubes 4 in the second heat transfer tube array 20 are connected to one another by third longitudinal fin members 25, 25, . . . , except the second opening 24. In addition, the second opening 24 is located at a position about 180 degree opposite to the first opening 22.

Between the first heat transfer tube array 19 and the second heat transfer tube array 20, gas passageways 10, 10 are formed so as to lead from the first opening 22 to the second opening 24. These gas passageways 10 communicate with the combustion chamber 21 via the first opening 22, and communicate with the exhaust gas exit 9 via the second opening 24. At this exhaust gas exit 9, is provided a NOx removal catalyst 18.

At the outlet of each gas passageway 10, i.e., at the second opening 24, is provided loading means 13 for loading a reducing agent. This loading means 13 is similar in constitution to that of the first embodiment and its detailed description is omitted. In this second embodiment, the jet nozzles 17 of the loading means 13 are arranged in a total number of six, three by three, along the axial direction of the heat transfer tubes 4, so as to be directed toward the outlet of the gas passageways 10. That is, the jet nozzles 17 are arranged so that ammonia as a reducing agent is jetted out in a direction opposite to the flow direction of combustion gas in the gas passageways 10.

With this constitution, when the burner 8 is operated, there occurs a combustion-reacting gas, i.e., a combustion gas in a flame state in the combustion chamber 21. This combustion gas in the flame state, which nearly completes its combustion reaction in the combustion chamber 21, flows into the gas passageways 10 through the first opening 22. Then the combustion gases, after flowing through the gas passageways 10, respectively, join together at the second opening 24 and are discharged from the exhaust gas exit 9 as exhaust gas.

During the operation of the burner 8, when the loading means 13 is operated, ammonia as the reducing agent is jetted out from the jet nozzles 17. The ammonia jetted out from the jet nozzles 17 is mixed with the combustion gas at the outlet of the gas passageways 10. In this process, ammonia is jetted out in a direction opposite to the flow direction of combustion gas, thus accelerating the mixing of ammonia and combustion gas. Then, the mixed ammonia and combustion gas are led to the NOx removal catalyst 18, where the reaction of NOx and ammonia is accelerated by the NOx removal catalyst 18, so that NOx in the combustion gas is reduced and decreased to a large extent.

The jet nozzles 17, which are provided at the outlet of the gas passageways 10, do not hinder the combustion in the burner 8 or the heat transfer in the heat transfer tubes 4 even though ammonia is jetted out from the jet nozzles 17. Also, since the space at the outlet of the gas passageways 10 can be effectively utilized as a fitting space for the jet nozzles 17, the jet nozzles can be easily provided additionally to existing boilers without requiring any additional space.

According to the present invention, the generation of NOx can be reduced to a great extent. Still, since the loading means is provided at the outlet of the gas passageways, reduction in NOx can be achieved without adversely affecting the combustion in the burner or the heat transfer in the heat transfer tubes. Also, the NOx removal system can be provided additionally to existing boilers with ease.

What is claimed is:

1. A boiler comprising:
    a boiler body having an interior and an exhaust gas exit from said interior for carrying exhaust gasses in a downstream direction from said interior;
    a plurality of heat transfer tubes in said interior;
    a burner directing a flame against said heat transfer tubes;
    at least one nozzle for directing a reducing agent into spaces between said heat transfer tubes;
    a source of a reducing agent connected to said nozzle for supplying a reducing agent to said nozzle; and
    a NOx removal catalyst downstream of the nozzle.

2. The boiler of claim 1 wherein said at least one nozzle faces toward said burner.

3. The boiler of claim 1 wherein said at least one nozzle is directed in an upstream direction relative to said exhaust gasses.

4. The boiler of claim 1 wherein said plurality of heat transfer tubes comprises a plurality of heat transfer tubes arranged in at least two rows.

5. The boiler of claim 1 wherein said plurality of heat transfer tubes comprises a first plurality of heat transfer tubes substantially surrounding a combustion space and a second plurality of heat transfer tubes substantially surrounding said first plurality of heat transfer tubes.

6. The boiler of claim 5 wherein the heat transfer tubes of said first plurality of heat transfer tubes are connected to adjacent ones of said first plurality of heat transfer tubes by fins.

7. The boiler of claim 5 wherein the heat transfer tubes of said second plurality of heat transfer tubes are connected to adjacent ones of said second plurality of heat transfer tubes by fins.

8. The boiler of claim 1 wherein said plurality of heat transfer tubes comprises a first plurality of heat transfer tubes arranged in a first circle and a second plurality of heat transfer tubes arranged in a second circle concentric with said first circle.

9. The boiler of claim 8 wherein said plurality of heat transfer tubes comprises a first plurality of heat transfer tubes arranged in a first circle and connected by fins and a second plurality of heat transfer tubes connected by fins and arranged in a second circle concentric with said first circle.

10. The boiler of claim 1 wherein said at least one nozzle is mounted between said plurality of heat transfer tubes and said exhaust gas exit.

* * * * *